United States Patent
Jansen

(10) Patent No.: US 8,758,466 B2
(45) Date of Patent: Jun. 24, 2014

(54) PIPE AND DEVICE FOR TRAPPING AND DISCHARGING A CONDENSATE EDGE FILM FOR INSTALLATION THEREIN

(75) Inventor: Matthias Jansen, Stolberg (DE)

(73) Assignee: Munters Euroform GmbH, Aachen (DE)

( * ) Notice: Subject to any disclaimer, the term of this patent is extended or adjusted under 35 U.S.C. 154(b) by 0 days.

(21) Appl. No.: 13/578,996

(22) PCT Filed: Feb. 18, 2011

(86) PCT No.: PCT/DE2011/000160
§ 371 (c)(1),
(2), (4) Date: Nov. 2, 2012

(87) PCT Pub. No.: WO2011/103858
PCT Pub. Date: Sep. 1, 2011

(65) Prior Publication Data
US 2013/0104741 A1    May 2, 2013

(30) Foreign Application Priority Data
Feb. 23, 2010  (DE) .......................... 10 2010 008 949

(51) Int. Cl.
*B01D 45/00*    (2006.01)
(52) U.S. Cl.
USPC .................. 55/344; 55/394; 55/396; 96/361; 96/364; 96/221; 96/355; 96/108; 96/192; 96/268; 96/269
(58) Field of Classification Search
CPC ............. Y02C 10/08; B01D 2253/102; B01D 2253/108; B01D 2257/504; B01D 53/02
USPC .............. 55/394, 396; 96/361, 364, 221, 355, 96/108, 192, 268, 269; 123/198 E
See application file for complete search history.

(56) References Cited

U.S. PATENT DOCUMENTS 7,857,879 B2    12/2010    Egger
2011/0209446 A1*    9/2011    Kayat et al. .................... 55/322

FOREIGN PATENT DOCUMENTS

| DE | 1080521 A | 4/1960 |
| DE | 3711413 A | 10/1987 |
| DE | 102004058700 A | 6/2006 |
| EP | 1911502 A | 4/2008 |
| FR | 660282 B | 2/1929 |

* cited by examiner

*Primary Examiner* — In Suk Bullock
*Assistant Examiner* — Dung H Bui
(74) *Attorney, Agent, or Firm* — Andrew Wilford

(57) ABSTRACT

A device in a pipe has an annular partition spaced radially inwardly from an inner face of the pipe and defining therewith an upstream annular space opening axially upstream of the direction into the pipe such that a secondary gas stream is separated from the primary gas stream along with a liquid film on the inner surface, a downstream annular space larger than the upstream annular space, and a droplet separator opening into the downstream annular space. The separator has a plurality of lamellas, a condensate sump, and a drain, so that the edge film intercepted by the partition into the upstream space passes therefrom into the downstream space and therefrom through the separator such that the liquid of the film flows into the sump and out the drain and the secondary gas stream passes out of the separator.

7 Claims, 2 Drawing Sheets

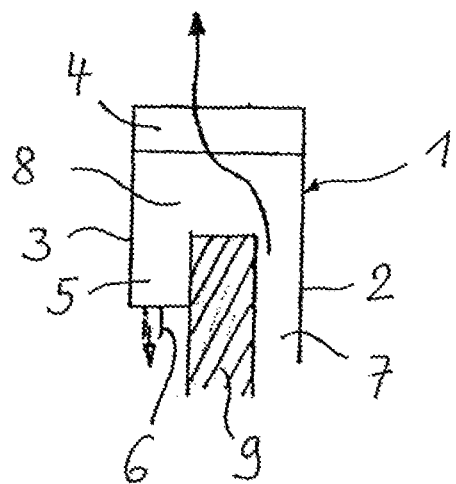
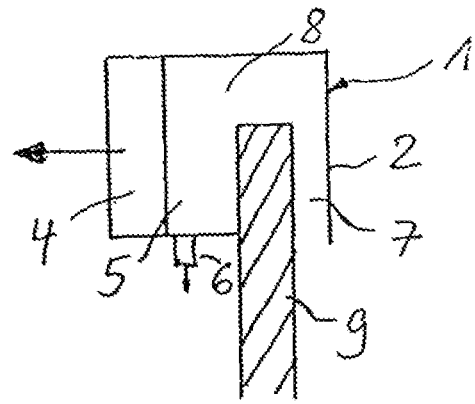
FIG. 1    FIG. 2
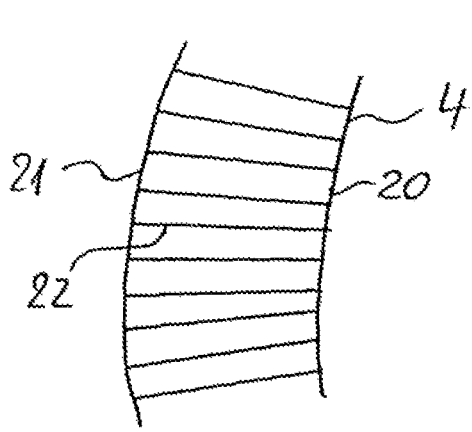
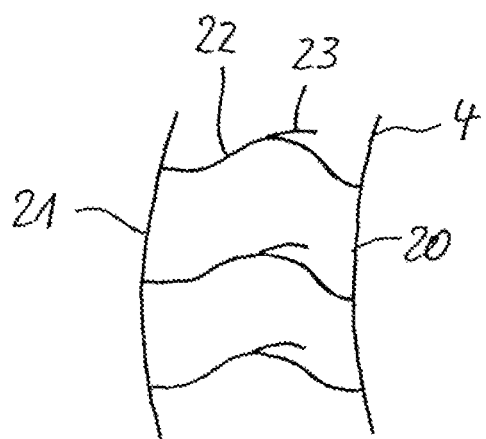
FIG. 4    FIG. 5

PIPE AND DEVICE FOR TRAPPING AND DISCHARGING A CONDENSATE EDGE FILM FOR INSTALLATION THEREIN

CROSS REFERENCE TO RELATED APPLICATIONS

This application is the US-national stage of PCT application PCT/DE2011/000160 filed 18 Feb. 2011, published 1 Sep. 2011 as WO2011/103858, and claiming the priority of German patent application 102010008949.4 itself filed 23 Feb. 2010.

FIELD OF THE INVENTION

The present invention is directed to a pipe for passing or discharging wet gases, especially for passing or discharging flue gases of a scrubbing process, comprising a device for trapping and discharging a condensate edge film having a partition arranged inside the pipe for the separation of a the secondary gas stream from the primary gas stream flowing through the pipe and an associated condensate discharge device.

Furthermore, the present invention relates to a device for trapping and discharging a condensate edge film for the installation in a pipe for passing or discharging wet gases.

When wet gases are passed or discharged through pipes condensate is generated by the contact of the primary gas stream with the relatively cold pipe wall which is developed in the form of a condensate edge film on the inner wall of the pipe. This condensate edge film is passed or entrained by the movement of the primary gas stream to the opening of the pipe and is discharged from the pipe together with the primary gas stream and exhausted (into the atmosphere) in the form of liquid droplets, mist etc. Of course, this is not desired and corresponding counter measures have been already taken.

Up to now one has frequently used reheating means in the form of heat exchangers or through direct introduction of energy by means of gas burners downstream of scrubbers, for instance scrubbers of flue gases, in order to feed the wet gas through large chimneys up to 400 m high without generating excessively much condensate. In this manner especially the ejection of coarse droplets from the chimney which fall down in the direct vicinity of the chimney should be prevented. However, these installations are very expensive and maintenance-intensive or require a high energy expenditure.

Therefore, modern installations were provided with so-called wet chimneys which are about 250 m high. Here, the gas transport is realized by means of pressure raising blowers upstream or downstream of the scrubber. However, also in this case the result is a high amount of condensate within the chimney and thus the ejection of coarse droplets from the chimney which fall down in the direct vicinity of the chimney due to the cooling of the wet gases on their way to the outlet of the chimney. Up to now only in a few cases installations, as for instance axial cyclones, were installed in the large chimneys apart from simple drainage means since these installations result in very high energy losses due to the high velocities in the chimney and also do not represent up to now a satisfying solution with respect to the discharge of droplets.

Furthermore, for reducing the ejection of droplets one has installed in many wet chimneys so-called film traps or other baffles which shall prevent the entraining of liquid films along the chimney wall. However, these measures are normally useful only in a limited manner since the liquid film is entrained or droplets are extricated from the film due to the high gas velocities in such chimneys. Accordingly, even with these installations a detrimental ejection of droplets cannot be completely prevented.

Another counter measure consists in providing such wet chimneys with device for trapping and discharging a condensate edge film s. These devices are arranged at the openings of the wet chimneys and cause a separation of a the secondary gas stream from the primary gas stream flowing through the wet chimney wherein this the secondary gas stream is to entrain the formed condensate edge film and thus is to separate the same from the main gas stream in the central range of the chimney. The condensate separating then from the secondary gas stream is caught and discharged through a condensate discharge device. However, these known device for trapping and discharging a condensate edge film s or "edge film traps" are connected with problems since the amount of the liquid which is introduced into the edge film reception and discharge device depends considerably from the leading of the primary gas stream to the device and into the device. Since the path passed by the secondary gas stream in the device for trapping and discharging a condensate edge film has only a small width compared with the pipe diameter a gas jamming zone can be formed in this region whereby the minimum velocity necessary for the condensate discharge is fallen short so that the condensate edge film is at least not completely entrained by the secondary gas stream but is conveyed outwardly at least partly past the edge film trap with the central gas stream out of the wet chimney so that the provided edge film trap becomes effective only partly or not at all. This "jamming effect" is still enforced by small outlet openings of the primary gas stream from the edge film trap or by several deflections of the primary gas stream in the same. Accordingly, a not unimportant part of the edge film is entrained by the central gas stream and is discharged into the atmosphere in the form of droplets, mist etc. in spite of the arrangement of such device for trapping and discharging a condensate edge film s or edge film traps.

It is the object of the present invention to provide a pipe for passing or discharging wet gases which has an especially effective device for trapping and discharging a condensate edge film.

According to the invention this object is attained with a pipe of the above-cited kind by the feature that the device for trapping and discharging a condensate edge film in its path passed by the separated the secondary gas stream has a droplet separator passed by the secondary gas stream.

The above-described disadvantages of the prior art are avoided with the inventive solution. Due to the arrangement of a droplet separator no narrowing or deflection of the flow channel arranged in the device for trapping and discharging a condensate edge film has to be realized in order to carry away the condensate. The droplet separator provided according to the invention is rather arranged downstream of the annular upstream space formed by the partition and extends preferably over the complete annular space so that preferably the whole cross-section of the annular space is covered by the droplet separator and is flown through by the secondary gas stream. Accordingly, a relatively wide flow path exists for the secondary gas stream so that the low flow velocity required for an effective droplet separation can be maintained. Substantially no significant jamming effect at the entrance into the device for trapping and discharging a condensate edge film takes place so that the edge film is detached in an effective manner and can be entrained by the secondary gas stream without part of the edge film being picked up by the main gas stream.

Preferably, the secondary gas stream is guided out of the pipe without deflection and passes through the droplet separator according to the invention. Accordingly, in this embodiment the secondary gas stream is guided substantially parallel to the main gas stream. However, the invention provides also an embodiment according to which the secondary gas stream is deflected, especially for about 90°, so that it leaves the pipe perpendicularly to the pipe axis.

In any case the droplet separator provided according to the invention separates the entrained liquid of the condensate edge film from the discharged the secondary gas stream and leads the liquid to the associated condensate discharge device which, for instance, can be formed as gas-stream free annular channel which can be drained by means of drainage lines.

According to a special embodiment of the invention the device for trapping and discharging a condensate edge film is arranged at the pipe outlet opening. Generally, the pipe can be arranged vertically or horizontally or can have any inclined position. Preferably, the pipe is designed as a so-called wet chimney where the device for trapping and discharging a condensate edge film is at the outlet opening of the wet chimney in the above-described embodiment. Here, the partition extends preferably beyond the end of the pipe or of the chimney and forms, together with a radially outer wall outside of the pipe wall or chimney wall, an annular space which is flown through by the secondary gas stream and at the outlet end of which the droplet separator is disposed.

According to another embodiment of the invention the device for trapping and discharging a condensate edge film is inside the pipe. Also in this case a partition inside the pipe and preferably annular causes the separation of the secondary gas stream in the region of the pipe wall which flows through the annular upstream space defined between the partition and the pipe wall. A droplet separator is arranged downstream of this annular space wherein also in this case the separated liquid is preferably fed into a gas stream-free annular channel or sump that can be drained by means of drainage lines. Accordingly, in this embodiment the device for trapping and discharging a condensate edge film is completely situated inside the pipe while in the above-described embodiment (arrangement at the pipe opening) it is disposed partly inside the pipe and partly outside of the pipe.

Preferably, the droplet separator is so arranged in the device for trapping and discharging a condensate edge film that it is vertically passed from the separated gas stream (the secondary gas stream). This embodiment is especially used when the pipe is arranged vertically which is the case with wet chimneys. Accordingly, in this case the secondary gas stream is not deflected and is led substantially parallel to the main gas stream.

However, the invention provides also a droplet separator which is passed horizontally and which is especially used in connection with lying pipes, however, also with vertically extending pipes wherein here the secondary gas stream is deflected for about 90°.

Preferably, the droplet separator is formed as an annular separator and, as mentioned above, is arranged downstream of the annular space flown through by the secondary gas stream within the device for trapping and discharging a condensate edge film.

Especially, the condensate reception and discharge device includes an annular space formed between the partition and the pipe wall which expands in gas flow direction to a larger downstream annular space at the end of which the droplet separator (annular separator) is arranged.

As mentioned, the annular separator is installed in such a manner that it is flown through either vertically or horizontally.

When the device for trapping and discharging a condensate edge film is arranged inside the pipe the annular separator is disposed between the pipe wall and the partition. When the device for trapping and discharging a condensate edge film is arranged at the pipe opening the annular separator is disposed between the partition and a gas flow path limiting member.

Preferably, the annular separator includes a plurality of radially extending droplet separator lamellas extending between a radially inner and radially outer or upper and lower limiting wall. Accordingly, when the annular separator is installed such that it is vertically flown through a radially inner and a radially outer limiting wall in annular shape are present wherein the individual droplet separator lamellas are preferably not extending parallel but radially extending. Accordingly, in this case the distance between the individual lamellas is larger radially outside than radially inside. The droplet separator lamellas can be designed in known manner, i.e. in a wave-like manner, and can be provided with trapping pockets. Such embodiments are known to the expert in the art so it is no more necessary to describe the same in detail here.

When the annular separator is installed such that it is horizontally flown through an upper and a lower limiting wall are present between which radially extending droplet separator lamellas are disposed. Also in this case the lamellas have preferably a smaller distance from one another radially inside than radially outside.

Preferably, furthermore the device for trapping and discharging a condensate edge film includes a condensate reception trough with drain which is appropriately designed as annular space, too, and which is situated outside of the gas flow path flown through by the secondary gas stream. The liquid is discharged through the drain or through a suitable drainage. It is essential that the condensate reception trough or the corresponding annular space is substantially free of flow so that the separated liquid can no more be entrained again by the primary gas stream.

With another embodiment of the invention the partition is designed conically and narrows in gas flow direction. This embodiment is especially used when the device for trapping and discharging a condensate edge film is arranged within the pipe in order to obtain in this manner no abrupt but a gradual narrowing of the flow path of the main gas stream at the place of the arrangement of the device for trapping and discharging a condensate edge film.

Of course, when a device for trapping and discharging a condensate edge film is arranged within the pipe several devices can be disposed one downstream of the other so that a multi-stage edge film reception and discharge device results.

Furthermore, the present invention is directed to a device for trapping and discharging a condensate edge film for the installation in a pipe of the above-cited kind. Such a device for trapping and discharging a condensate edge film can include all the above-cited features. Accordingly, it is not necessary to repeat these features in detail here.

BRIEF DESCRIPTION OF THE DRAWING

In the following the invention is described with reference to examples in connection with the drawings in detail. In the drawings FIG. 1 is a schematic sectional view of the outlet opening of a wet chimney of a first embodiment of a device for trapping and discharging a condensate edge film;

FIG. 2 is a schematic sectional view like FIG. 1 of a second embodiment of a device for trapping and discharging a condensate edge film;

FIG. 4 is a schematic top view of part of a droplet separator of the device for trapping and discharging a condensate edge film formed as annular separator; and FIG. 5 is an enlarged detail view of the annular separator of FIG. 4.

SPECIFIC DESCRIPTION OF THE INVENTION

Figure 3:
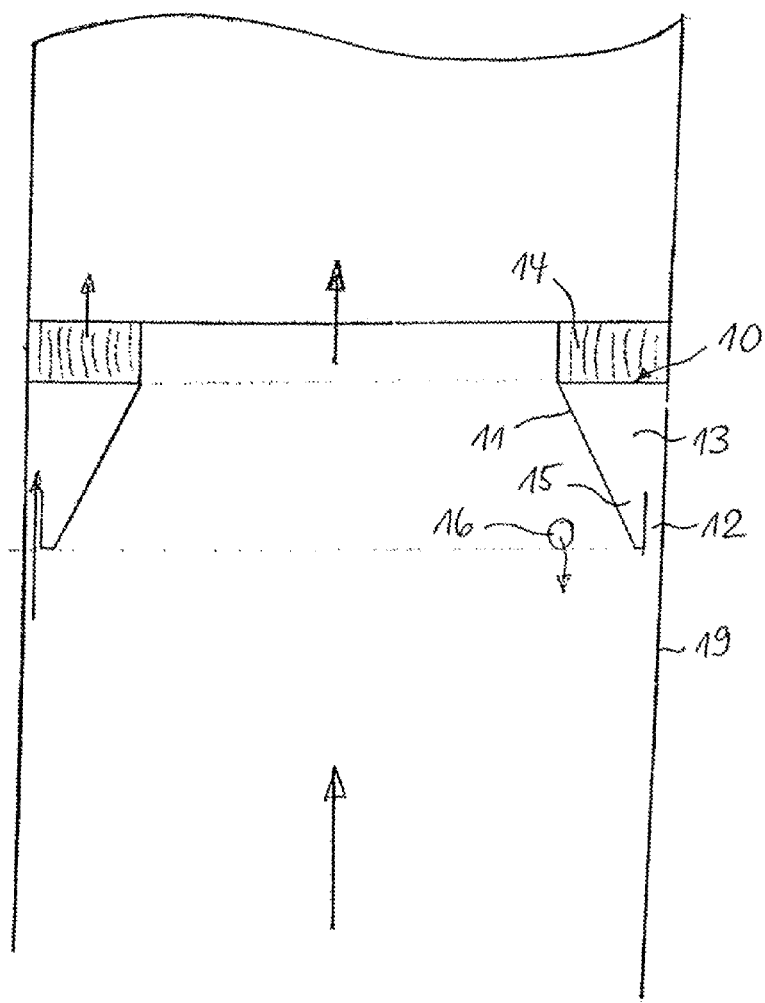
FIG. 3 is a schematic sectional view of a part of a wet chimney with another embodiment of a device for trapping and discharging a condensate edge film.

In the schematic vertical cross-sectional view of FIG. 1 the outlet opening of a wet chimney is shown at 9. A device 1 for trapping and discharging a condensate edge film is schematically shown at the outlet of the wet chimney 9. The device 1 has an annular partition 2 that extends from outside into the interior of the chimney 9. In this manner an annular upstream space 7 is formed between the partition 2 and the chimney wall 9. This annular upstream space 7 opens into a larger annular downstream space 8 formed between an annular outer wall 3 and the partition 2. The gas flow direction is upward in FIG. 1. A droplet separator in the shape of an annular separator 4 is arranged in gas flow direction downstream of the annular space 8 and is also between the partition 1 and the outer wall 3. An annular condensate sump 5 having a condensate drain 6 is arranged below the annular space 8 at the outside of the chimney wall 9.

The device for trapping and discharging a condensate edge film 1 functions in the following manner:

The wet gas flowing in the wet chimney upwardly to the opening comes to the partition 2 and is divided by the same into a central the secondary gas stream and a radially outer the secondary gas stream which enters the annular upstream space 7. The condensate generated at the inner side of the chimney wall 9 and upwardly entrained by the primary gas stream is entrained by the formed radially outer the secondary gas stream into the annular upstream space 7 and enters the wider downstream annular space 8 and from there the droplet separator 4 arranged downstream. This droplet separator formed as annular separator has a plurality of radially extending wave-like lamellas with interception pockets. When passing the annular separator the condensate entrained with the secondary gas stream is separated and gets downwardly into the annular condensate sump 5 by gravity and is discharged through a drain 6 therefrom. The secondary gas stream that has passed the droplet separator 4 is discharged to the atmosphere.

In the droplet separator 4 shown in FIG. 1 the individual droplet separator lamellas extend radially and vertically. The droplet separator is flown through vertically. FIG. 2 shows an embodiment in which the droplet separator 4 is flown through horizontally. Also the device for trapping and discharging a condensate edge film shown in FIG. 2 has a partition 2, an annular upstream space 7 formed between the chimney wall 9 and the partition 2, a subsequent enlarged annular downstream space 8, an annular condensate sump 5 and a condensate drain 6. The secondary gas stream entraining the condensate edge film is deflected through about 90° into the annular downstream space 8 from the annular upstream space 7 and flows from there horizontally into the droplet separator 4. It is also designed as an annular separator and has radially and vertically extending droplet separator lamellas extending between an upper and a lower wall. They are horizontally flown through as shown by the arrow. The condensate separated in the droplet separator 4 is intercepted in the annular space 5 and is discharged through the drain 6. The secondary gas stream moves into the atmosphere from the droplet separator 4.

FIG. 3 is a schematic vertical sectional view of a wet chimney that in this embodiment is provided with a device 10 for trapping and discharging a condensate edge film is inside the wet chimney and not at the outlet opening thereof. Also in this embodiment the device 10 for trapping and discharging a condensate edge film has an annular partition 11 that frustoconically tapers in the upward gas flow direction in FIG. 3. The partition 11 is bent upward at its lower end and extending parallel to the chimney wall 19 so as to define with the chimney wall 19 an annular space 12. The annular space 12 expands upward to form a wider annular space 13 holding a droplet separator 14 formed as an annular separator. Inside the chimney 19 are several devices 1 as shown in FIG. 3 can be arranged one downstream of the other in the gas flow direction.

A the secondary gas stream is separated from the primary gas stream by the partition 11 and enters the annular space 12 wherein it entrains the condensate edge film formed on the inner face of the chimney wall 19. Then the secondary gas stream moves into the enlarged annular downstream space 13 and from there into the droplet separator 14. The droplet separator has a plurality of radially and vertically extending wave-like droplet separator lamellas provided with interception pockets. As the secondary gas stream passes the droplet separator 14 the entrained condensate is separated and intercepted in an annular condensate sump 15 formed between the lower part of the partition 11 and its portion extending parallel to the chimney wall 19. From there the condensate is discharged through a drain shown schematically at 16. The secondary gas stream that passes through the droplet separator 14 then reunites with the main gas stream of the wet chimney.

FIG. 4 is a schematic top view of a part of the droplet separator 4 formed as annular separator. The annular separator has a plurality of radially extending wave-like droplet separator lamellas 21 provided with interception noses. Such lamellas are known so that their construction is not described in detail here. The spacing between the lamellas 22 increases radially outwardly. The lamellas 22 extend between an outer wall 21 and an inner wall 20 formed by the partition 2 and the outer wall 3 in the embodiment of FIG. 1, by the partition 2 deflected around 90° and a lower wall in the embodiment of FIG. 2 and by a portion of the partition 11 parallel to the chimney wall 19 and an outer wall formed by the chimney wall 19 in the embodiment of FIG. 3.

FIG. 5 is a larger view of the droplet separator portion of FIG. 4. One recognizes the individual wave-like lamellas 22 with corresponding interception noses 23. The shown annular separator is flown through vertically.

The invention claimed is:

1. In combination with a pipe centered on an axis and through which wet flue gases of a scrubbing process pass axially as a stream in a flow direction, a device comprising:

an annular partition spaced radially inwardly from an inner face of the pipe and defining therewith an upstream annular space opening axially upstream of the direction into the pipe such that a secondary gas stream is separated from the primary gas stream along with a liquid film on the inner surface;

structure at a downstream end of the partition forming a downstream annular space larger than the upstream annular space; and a droplet separator opening into the downstream annular space and having a plurality of lamellas, a condensate sump, and a drain, whereby the edge film intercepted by the partition into the upstream space passes therefrom into the downstream space and therefrom through the separator such that the liquid of the film flows into the sump and out the drain and the secondary gas stream passes out of the separator.

2. The combination defined in claim 1, wherein the device is at an outlet of the pipe.

3. The combination defined in claim 1, wherein the partition, structure, and separator are inside the pipe.

4. The combination defined in claim 1, wherein the axis is vertical, the direction is upward, and the droplet separator is above the downstream space.

5. The combination defined in claim 1, wherein the axis is vertical, the direction is upward, and the droplet separator is horizontally offset from the downstream space such that the secondary stream flows horizontally through the separator.

6. The combination defined in claim 1, wherein the partition is partly frustoconical and tapers axially downstream so as to diverge from the inner pipe surface.

7. The combination defined in claim 1, wherein the lamellas extend radially.

\* \* \* \* \*